United States Patent
Song et al.

(10) Patent No.: US 9,355,454 B2
(45) Date of Patent: May 31, 2016

(54) AUTOMATIC ESTIMATION OF ANATOMICAL EXTENTS

(71) Applicant: General Electric Company, Schenectady, NY (US)

(72) Inventors: Qi Song, Niskayuna, NY (US); Srikrishnan V, Bangalore (IN); Roshni Rustom Bhagalia, Niskayuna, NY (US); Bipul Das, Bangalore (IN)

(73) Assignee: GENERAL ELECTRIC COMPANY, Niskayuna, NY (US)

( * ) Notice: Subject to any disclaimer, the term of this patent is extended or adjusted under 35 U.S.C. 154(b) by 317 days.

(21) Appl. No.: 13/852,781

(22) Filed: Mar. 28, 2013

(65) Prior Publication Data
US 2014/0294276 A1 Oct. 2, 2014

(51) Int. Cl.
*G06T 7/00* (2006.01)
*G06K 9/62* (2006.01)
*G06K 9/36* (2006.01)

(52) U.S. Cl.
CPC .............. *G06T 7/0046* (2013.01); *G06K 9/621* (2013.01); *G06T 7/0012* (2013.01); *G06K 2009/366* (2013.01); *G06K 2209/051* (2013.01); *G06T 2207/10072* (2013.01); *G06T 2207/10136* (2013.01); *G06T 2207/20081* (2013.01); *G06T 2207/30004* (2013.01)

(58) Field of Classification Search
USPC ......................................................... 345/419
See application file for complete search history.

(56) References Cited

U.S. PATENT DOCUMENTS

| | | | |
|---|---|---|---|
| 7,738,705 B2 | 6/2010 | Casadei et al. | |
| 7,747,054 B2* | 6/2010 | Zhou et al. | 382/128 |
| 8,014,578 B2 | 9/2011 | Suryanarayanan et al. | |
| 8,150,116 B2 | 4/2012 | Zhou et al. | |
| 2002/0106051 A1* | 8/2002 | Menhardt | G01N 23/04 378/4 |
| 2007/0140438 A1* | 6/2007 | Horndler | A61B 6/12 378/207 |
| 2008/0188734 A1* | 8/2008 | Suryanarayanan et al. | 600/407 |
| 2009/0136103 A1* | 5/2009 | Sonka et al. | 382/128 |
| 2010/0232686 A1* | 9/2010 | Dewan | G06K 9/6209 382/159 |
| 2011/0052018 A1* | 3/2011 | Blaffert et al. | 382/128 |
| 2011/0116698 A1* | 5/2011 | Weis et al. | 382/131 |
| 2012/0062701 A1* | 3/2012 | Dillon | A61B 5/0062 348/45 |

OTHER PUBLICATIONS

Sun et al., "Knowledge-Based Method for Fully Automatic Contour Detection in Radiographs", Proc SPIE 3979, Medical Imaging 2000 Image Processing, Jun. 6, 2000.
Cootes et al., "Active Appearance Models", IEEE Transactions on Pattern Analysis and Machine Intelligence, pp. 681-685, vol. 23, Issue 6, 2001.
Cootes et al., "Constrained Active Appearance Models", IEEE International Conference on Computer Vision, pp. 748-754, vol. 1, 2001.

(Continued)

*Primary Examiner* — Barry Drennan
*Assistant Examiner* — Terrell Robinson
(74) *Attorney, Agent, or Firm* — Fletcher Yoder, P.C.

(57) ABSTRACT

A hierarchical multi-object active appearance model (AAM) framework is disclosed for processing image data, such as localizer or scout image data. In accordance with this approach, a hierarchical arrangement of models (e.g., a model pyramid) maybe employed where a global or parent model that encodes relationships across multiple co-located structures is used to obtain an initial, coarse fit. Subsequent processing by child sub-models add more detail and flexibility to the overall fit.

12 Claims, 9 Drawing Sheets

(56) References Cited

OTHER PUBLICATIONS

Liu et al., "Hierarchical Shape Modeling for Automatic Face Localization", In Proc European Conference on Computer Vision, pp. 1-17, 2002.

Roberts et al., "Linking Sequences of Active Appearance Sub-Models via Constraints: an Application in Automated Vertebral Morphometry", British Machine Vision Conference—BMVC, pp. 1-10, 2003.

Davatzikos et al., "Hierarchical Active Shape Models Using the Wavelet Transform", IEEE Transactions on Medical Imaging, pp. 1-10, vol. 22, Issue 3, Mar. 2003.

Shi et al., "Hierarchical Shape Statistical Model for Segmentation of Lung Fields in Chest Radiographs", Proceeding MICCAI '08 Proceedings of the 11th International conference on Medical Image Computing and Computer-Assisted Intervention—Part I, pp. 417-428, 2008.

Liu., "Discriminative Face Alignment", IEEE Transactions on Pattern Analysis and Machine Intelligence, pp. 1941-1954, vol. 31, Issue 11, 2009.

Peng et al., "Robust Anatomy Detection From CT Topograms", Proc of SPIE Medical Imaging, 2009.

Montillo et al., "Parsing Radiographs by Integrating Landmark set Detection and Multi-Object Active Appearance Models", Proc of SPIE Medical Imaging, pp. 1-6, 2013.

* cited by examiner

AUTOMATIC ESTIMATION OF ANATOMICAL EXTENTS

BACKGROUND

The subject matter disclosed herein relates to the estimation and localization of anatomical structures within a volume of interest.

Non-invasive imaging technologies allow images of the internal structures or features of a patient to be obtained without performing an invasive procedure on the patient. In particular, such non-invasive imaging technologies rely on various physical principles (such as the differential transmission of X-rays through the target volume, the reflection of acoustic waves within the volume, the paramagnetic properties of different tissues and materials within the volume) to acquire data and to construct images or otherwise represent the observed internal features of the patient.

With respect to such non-invasive imaging technologies, numerous medical image processing workflows rely on fast two-dimensional (2D) scans to identify target regions of interest for accurate scanner set-up and planning. Manually identifying regions of interest can be time consuming, hard to reproduce and is prone to operator error. Further, these localizer scans are typically two-dimensional projections of three-dimensional data and, as such, may have lower image detail due to overlapping tissue.

BRIEF DESCRIPTION

In one embodiment, a computer-implemented method for generating hierarchical models is provided, incorporating both shape and appearance information. In accordance with the method, a set of training images annotated to include a set of feature points defining extents of anatomical structures is accessed. A global model is generated using the set of training images and the full set of feature points. Two or more sub-models are generated using the set of training images and subsets of the feature points.

In a further embodiment, a computer-implemented method for initializing a global model of a set of hierarchical models is provided. In accordance with the method, a localizer image acquired as part of a current patient examination using an imaging system is accessed. One or more two-dimensional profiles of radiation attenuation are generated based on the localizer image. Extents of one or more anatomical structures within the patient are determined based on the one or more two-dimensional profiles. The global model of the set of hierarchical models is initialized based on the determined extents.

In an additional embodiment, an image acquisition system is provided. The image acquisition system comprises: one or more scanner components configured to non-invasively acquire images of a patient, a controller configured to control operation of the one or more scanning components; a memory storing one or more routines; and a processing component configured to communicate with the controller and to execute the one or more routines stored in the memory. The one or more routines, when executed by the processing component, cause acts to be performed comprising: accessing a localizer image acquired as part of a current patient examination using the image acquisition system; generating one or more two-dimensional profiles of radiation attenuation based on the localizer image; determining extents of one or more anatomical structures within the patient based on the one or more two dimensional profiles; and initializing the global model of the set of hierarchical models based on the determined extents. In certain embodiments, following the initialization, a hierarchical model fitting is performed. In the coarse level, a global appearance model is fitted in to the localizer image. Then sub-models are fitted in sequence under the constraints of global fitting results as well as prior sub-model fitting results. The refined model determines the location of target areas in the localizer image.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

With the foregoing comments in mind, the present approach presents a fast, robust and fully automatic model-based method to identify specific anatomies from 2D scans. While shape and appearance models have been successfully used contexts, these models may suffer from a various drawbacks, such as: (i) large global models encoding relationships between numerous structures can become very 'stiff', i.e., lose their ability to adapt to new instances with shape and appearance realizations not represented in the training databases. (ii) Small local models are less constrained, can adapt more readily to 'unseen' configurations but their added flexibility makes them very susceptible to model initialization errors.

To address these issues, the present approach employs a hierarchical model pyramid where global (parent) models encoding relationships across a number of co-located structures are used to obtain a coarse initial fit. In subsequent hierarchical levels, the parent-models are further sub-divided to add more detail and flexibility to the overall fit. Each level benefits from a robust initialization from the preceding stage, while adding more controlled flexibility in detecting finer and smaller structures. Such an approach can deal with biological systems which display vast versatility in shape and size, including structural abnormalities due to medical conditions or surgical intervention.

The approaches disclosed herein may be suitable for use with a range of image reconstruction systems. To facilitate explanation, the present disclosure will primarily discuss the present reconstruction approaches in one particular context, that of a CT system. However, it should be understood that the following discussion may also be applicable to other image reconstruction modalities and systems as well as to non-medical contexts.

Figure 1:
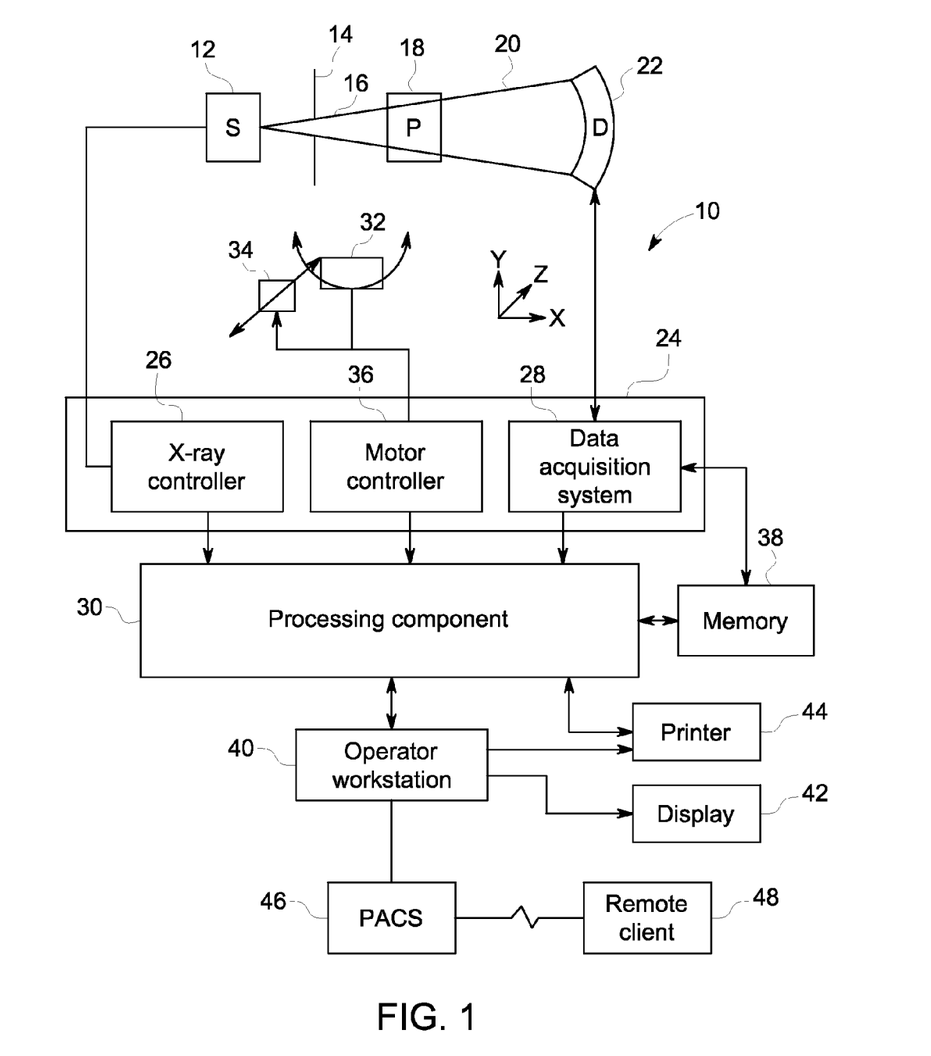
FIG. 1 is a block diagram depicting components of a computed tomography (CT) imaging system, in accordance with aspects of the present disclosure.

With this in mind, an example of a computer tomography (CT) imaging system 10 designed to acquire X-ray attenuation data at a variety of views around a patient (or other subject or object of interest) and suitable for image reconstruction is provided in FIG. 1. In the embodiment illustrated in FIG. 1, imaging system 10 includes a source of X-ray radiation 12 positioned adjacent to a collimator 14. The X-ray source 12 may be an X-ray tube, a distributed X-ray source (such as a solid-state or thermionic X-ray source) or any other source of X-ray radiation suitable for the acquisition of medical or other images.

The collimator 14 permits X-rays 16 to pass into a region in which a patient 18, is positioned. In the depicted example, the X-rays 16 are collimated to be a cone-shaped beam, i.e., a cone-beam, that passes through the imaged volume. A portion of the X-ray radiation 20 passes through or around the patient 18 (or other subject of interest) and impacts a detector array, represented generally at reference numeral 22. Detector elements of the array produce electrical signals that represent the intensity of the incident X-rays 20. These signals are acquired and processed to reconstruct images of the features within the patient 18.

Source 12 is controlled by a system controller 24, which furnishes both power, and control signals for CT examination sequences, including acquisition of 2D localizer or scout images used to identify anatomy of interest within the patient for subsequent scan protocols. In the depicted embodiment, the system controller 24 controls the source 12 via an X-ray controller 26 which may be a component of the system controller 24. In such an embodiment, the X-ray controller 26 may be configured to provide power and timing signals to the X-ray source 12.

Moreover, the detector 22 is coupled to the system controller 24, which controls acquisition of the signals generated in the detector 22. In the depicted embodiment, the system controller 24 acquires the signals generated by the detector using a data acquisition system 28. The data acquisition system 28 receives data collected by readout electronics of the detector 22. The data acquisition system 28 may receive sampled analog signals from the detector 22 and convert the data to digital signals for subsequent processing by a processor 30 discussed below. Alternatively, in other embodiments the digital-to-analog conversion may be performed by circuitry provided on the detector 22 itself. The system controller 24 may also execute various signal processing and filtration functions with regard to the acquired image signals, such as for initial adjustment of dynamic ranges, interleaving of digital image data, and so forth.

In the embodiment illustrated in FIG. 1, system controller 24 is coupled to a rotational subsystem 32 and a linear positioning subsystem 34. The rotational subsystem 32 enables the X-ray source 12, collimator 14 and the detector 22 to be rotated one or multiple turns around the patient 18, such as rotated primarily in an x,y-plane about the patient. It should be noted that the rotational subsystem 32 might include a gantry upon which the respective X-ray emission and detection components are disposed. Thus, in such an embodiment, the system controller 24 may be utilized to operate the gantry.

The linear positioning subsystem 34 may enable the patient 18, or more specifically a table supporting the patient, to be displaced within the bore of the CT system 10, such as in the z-direction relative to rotation of the gantry. Thus, the table may be linearly moved (in a continuous or step-wise fashion) within the gantry to generate images of particular areas of the patient 18. In the depicted embodiment, the system controller 24 controls the movement of the rotational subsystem 32 and/or the linear positioning subsystem 34 via a motor controller 36.

In general, system controller 24 commands operation of the imaging system 10 (such as via the operation of the source 12, detector 22, and positioning systems described above) to execute examination protocols, including localizer or scout scan protocols, and to process acquired data. For example, the system controller 24, via the systems and controllers noted above, may rotate a gantry supporting the source 12 and detector 22 about a subject of interest so that X-ray attenuation data may be obtained at one or more views relative to the subject. In the present context, system controller 24 may also includes signal processing circuitry, associated memory circuitry for storing programs and routines executed by the computer (such as routines for executing image processing techniques described herein), as well as configuration parameters, image data, and so forth.

In the depicted embodiment, the image signals acquired and processed by the system controller 24 are provided to a processing component 30 for reconstruction of images. The processing component 30 may be one or more conventional microprocessors. The data collected by the data acquisition system 28 may be transmitted to the processing component 30 directly or after storage in a memory 38. Any type of memory suitable for storing data might be utilized by such an exemplary system 10. For example, the memory 38 may include one or more optical, magnetic, and/or solid state memory storage structures. Moreover, the memory 38 may be located at the acquisition system site and/or may include remote storage devices for storing data, processing parameters, and/or routines for image reconstruction, as described below.

The processing component 30 may be configured to receive commands and scanning parameters from an operator via an operator workstation 40, typically equipped with a keyboard and/or other input devices. An operator may control the system 10 via the operator workstation 40. Thus, the operator may observe the reconstructed images and/or otherwise operate the system 10 using the operator workstation 40. For example, a display 42 coupled to the operator workstation 40 may be utilized to observe the reconstructed images and to control imaging. Additionally, the images may also be printed by a printer 44 which may be coupled to the operator workstation 40.

Further, the processing component 30 and operator workstation 40 may be coupled to other output devices, which may include standard or special purpose computer monitors and associated processing circuitry. One or more operator workstations 40 may be further linked in the system for outputting system parameters, requesting examinations, viewing images, and so forth. In general, displays, printers, workstations, and similar devices supplied within the system may be local to the data acquisition components, or may be remote from these components, such as elsewhere within an institution or hospital, or in an entirely different location, linked to the image acquisition system via one or more configurable networks, such as the Internet, virtual private networks, and so forth.

It should be further noted that the operator workstation 40 may also be coupled to a picture archiving and communications system (PACS) 46. PACS 46 may in turn be coupled to a remote client 48, radiology department information system (RIS), hospital information system (HIS) or to an internal or external network, so that others at different locations may gain access to the raw or processed image data.

While the preceding discussion has treated the various exemplary components of the imaging system 10 separately, these various components may be provided within a common platform or in interconnected platforms. For example, the processing component 30, memory 38, and operator workstation 40 may be provided collectively as a general or special purpose computer or workstation configured to operate in accordance with the aspects of the present disclosure. In such embodiments, the general or special purpose computer may be provided as a separate component with respect to the data acquisition components of the system 10 or may be provided in a common platform with such components. Likewise, the system controller 24 may be provided as part of such a computer or workstation or as part of a separate system dedicated to image acquisition.

With the foregoing system discussion in mind, the system of FIG. 1 may be utilized to acquire images of a region of interest of a patient. As part of the imaging process, one or more 2D localizer images may be initially acquired to help orient the system with respect to the patient and, more particularly, with respect to the region of interest to be subsequently imaged. As discussed herein, automated approaches to analyzing such localizer images and utilizing the analysis results for the subsequent imaging process are disclosed. In one implementation, image interpretation of the localizer images may be based on active appearance models (AAMs). In particular, multi-object active appearance models present a principled way to include prior knowledge in the region of interest (ROI) detection process when faced with low image quality and partial information, such as may be the case when analyzing localizer images. In particular, in one embodiment such active appearance models encode both the relative shape and positional relationships between multiple co-located objects and learn the expected appearance of the ROI. However the flexibility of these models is a function of their training data, i.e., model based methods may fail when presented with a new instance of the ROI not adequately represented in the training databases.

With this in mind, certain present implementations employ multi-resolution or hierarchical approaches. For example, in one embodiment a hierarchical pyramid of increasingly flexible (and possibly more detailed) sub-models is employed. In this example, at the coarsest level of the pyramid a gross global multi-object active appearance model is employed that encodes the interrelationships between multiple large structures. Such models capture global context and are consequently less sensitive to initialization errors at the expense of model flexibility. In subsequent levels of the pyramid, the global model is divided into multiple, possibly overlapping and more intricate, child sub-models. In one implementation, each sub-model shares a few feature points in common with its parent model and has the option of incorporating additional feature points (i.e., more detail) to better represent its target subsystem. In such an implementation, models at finer levels of the pyramid are initialized using fits obtained from the previous level. Further, feature points that are common between parent and child models can be held fixed to anchor the fit of each child model. The process advances through the large global models at one computational level (e.g., the bottom of the pyramid) to more intricate sub-models at subsequent computational levels (e.g., the top of the pyramid), allowing larger, easily detectable structures to stabilize and aid the detection of smaller more intricate structures that may be hard to localize by themselves.

Figure 2:
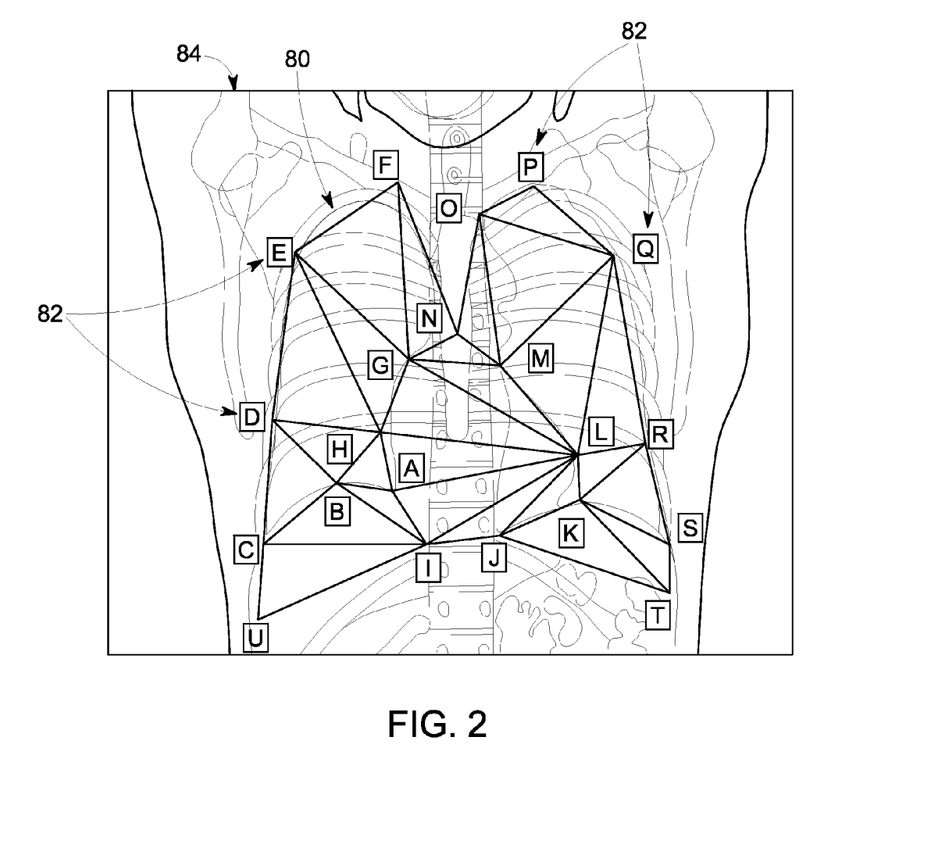
FIG. 2 depicts a labeled training image, in accordance with aspects of the present disclosure.
Figure 3:
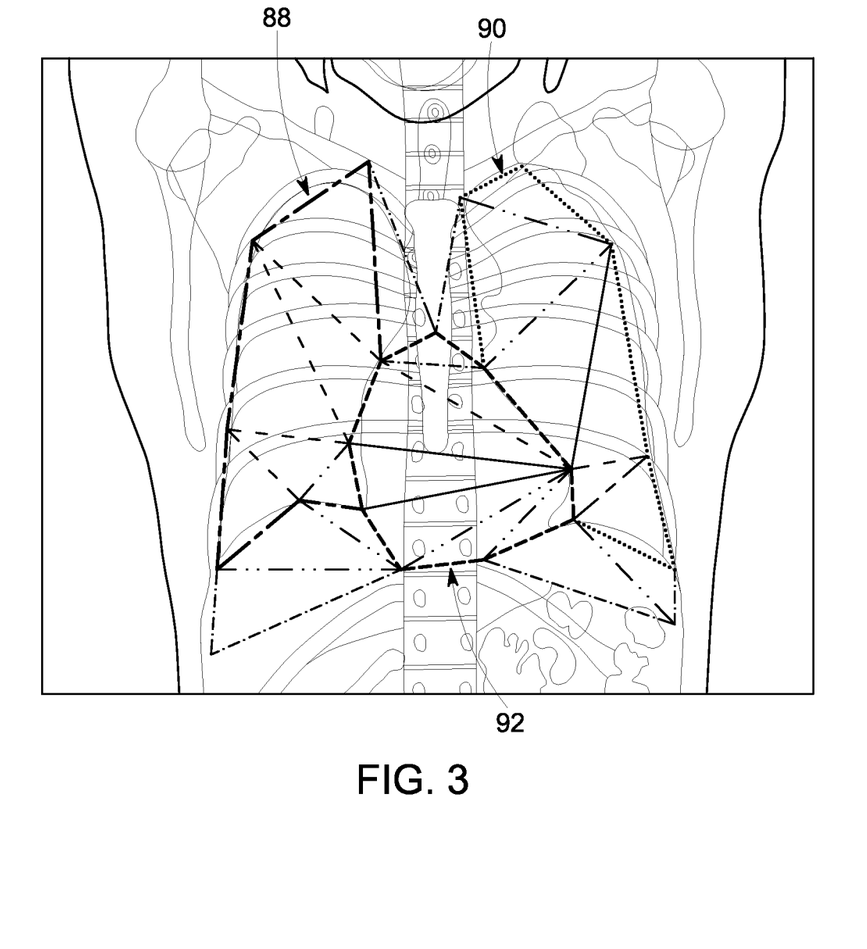
FIG. 3 depicts a training image on which locations of organs of interest are displayed by connecting segments of a mesh defined by the labels of FIG. 2, in accordance with aspects of the present disclosure.

With respect to construction of the models, in one example a two level hierarchical-active appearance model (H-AAM) pyramid may be employed to model the chest cavity. In this example, at the coarsest (i.e., broadest) level of the pyramid a single global model may be employed to encode the relative position of the lungs, diaphragm and heart. With respect to model construction, the global model may be trained using feature points manually annotated on topograms (e.g., localizer or scout views acquired as lateral or frontal 2D images) from a training database. In particular, model feature points are selected that correspond to readily discernible points along the heart, lungs and surrounding anatomical structures. In one embodiment, a triangulated mesh 80 is then constructed based on the feature points 82, to define the spatial relationship between neighboring points. FIG. 2 shows an example of a labeled training image 84 and its associated mesh 80. In FIG. 2, the right lung 88 is associated with the manual annotations A, B, C, D, E, F, G, H, the left lung 90 is associated with the manual annotations K, L, M, O, P, Q, R, A, and the heart 92 is associated with the manual annotations A, G, H, I, J, K, L, M, N. In addition, in this example two additional manual annotations are provided to stabilize detection of the base of the lungs 88, 90. Approximate locations for both lungs 88, 90 and the heart 92 can be obtained by connecting certain segments in the mesh 80 (see FIG. 3).

Based on N annotated feature points in each of T training set images, the shape of the $t^{th}$ training image is represented by vector:

$$v^t = [x_1^t, y_1^t, x_2^t, y_2^t, \ldots, x_N^t, y_N^t]' \quad (1)$$

where $(x_i^t, y_i^t)$ are the 2D coordinates of the $i^{th}$ feature point in the $t^{th}$ training image. Using this representation, the shape model is given by a Gaussian distribution of feature points. In one embodiment, Eigen-analysis may be applied on the population of shape vectors from the training data to build the shape model given by:

$$s = \bar{s} + \sum_{i=1}^{K} p_i s_i$$

where $\bar{s}$ is the mean shape, $s_i$ is the $i^{th}$ shape basis and $p_i$ is the corresponding shape coefficient. To obtain the appearance model, in one implementation each training image is mapped on to the mean shape using an affine transformation. In this implementation, a second Eigen-analysis is then performed on the shape-normalized appearances from all pixels inside the mean shape. The resulting appearance model can be represented as:

$$A = \bar{A} + \sum_{j=1}^{M} \lambda_j A_j \quad (3)$$

where $\bar{A}$ is the mean appearance, $A_j$ is the $j^{th}$ appearance basis and $\lambda_j$ is the corresponding appearance coefficient.

Figure 4:
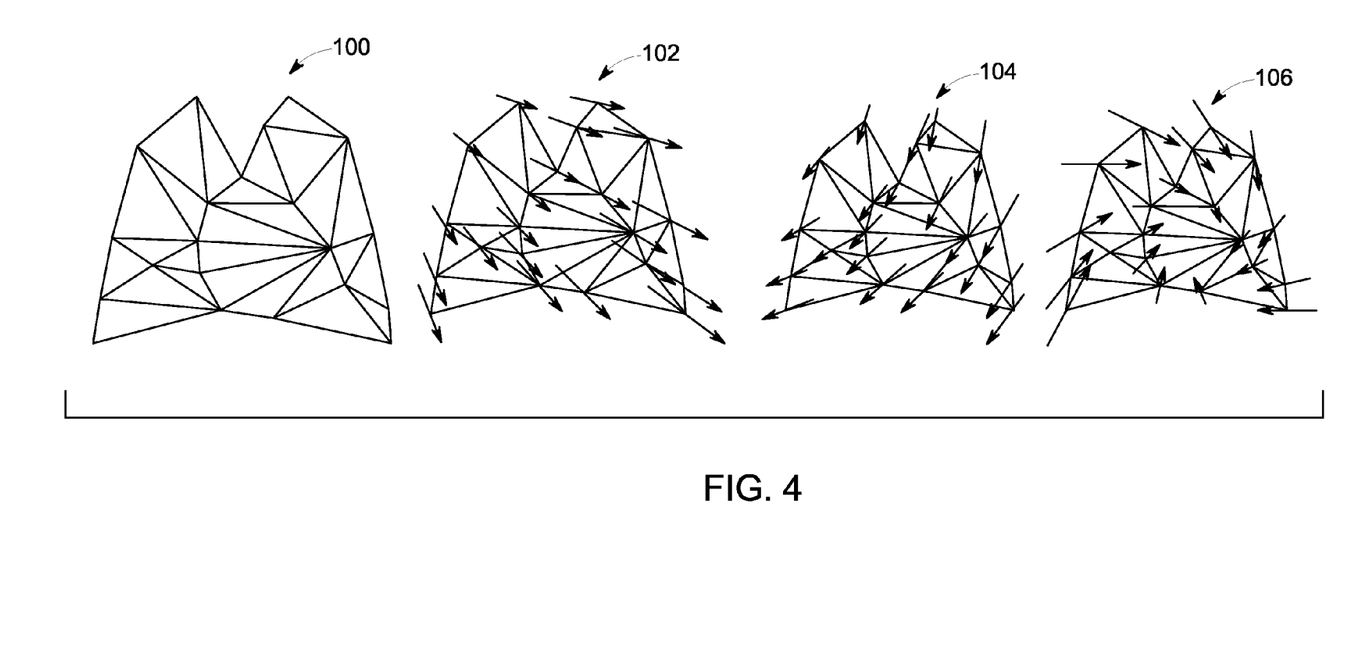
FIG. 4 depicts a global active shape model, in accordance with aspects of the present disclosure.
Figure 5:
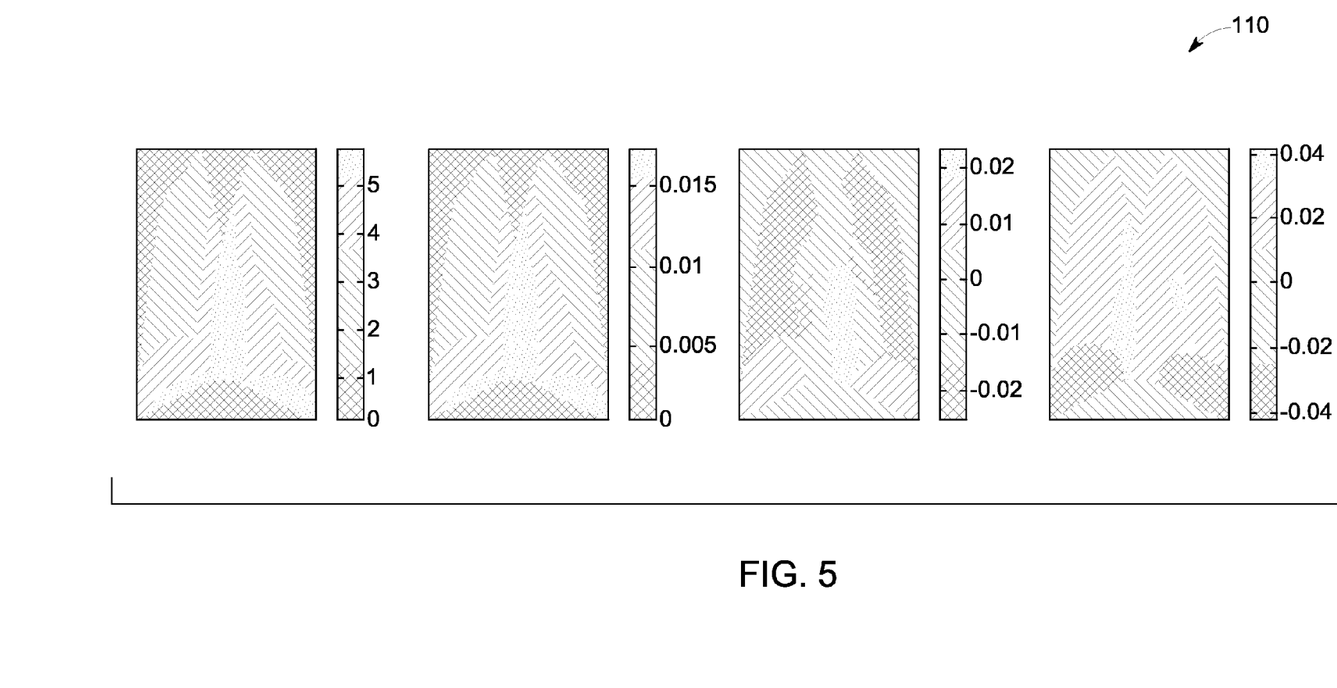
FIG. 5 depicts a global active appearance model, in accordance with aspects of the present disclosure.

FIGS. 4 and 5 show examples of a constructed active shape model (ASM) (FIG. 4) and the active appearance model (AAM) (FIG. 5). For example, FIG. 4, depicts the mean 100 and three basis vector 102, 104, 106 corresponding to the largest eigen values of a global shape model of the chest cavity. Similarly, FIG. 5 depicts the corresponding global appearance model 110.

Figure 6:
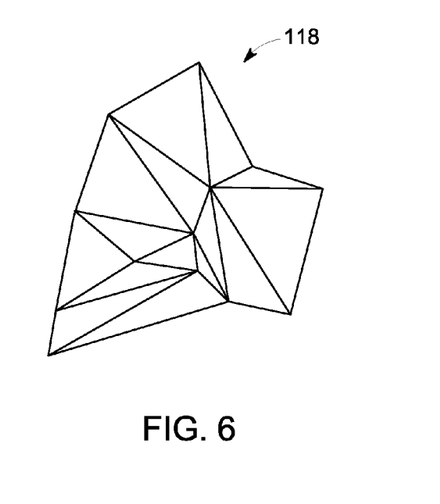
FIG. 6 depicts a child active shape sub-model of a right lung, in accordance with aspects of the present disclosure.
Figure 7:
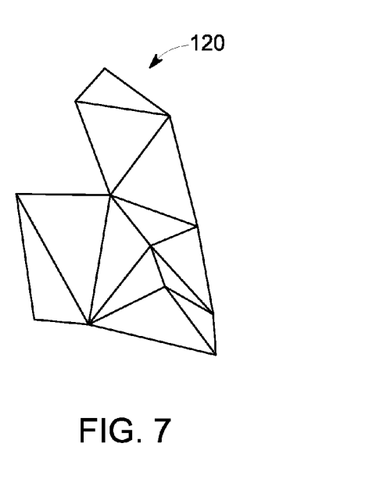
FIG. 7 depicts a child active shape sub-model of a left lung, in accordance with aspects of the present disclosure.
Figure 8:
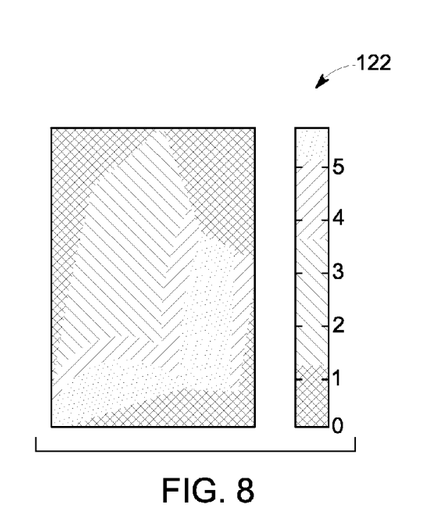
FIG. 8 depicts a child active appearance sub-model of a right lung, in accordance with aspects of the present disclosure.
Figure 9:
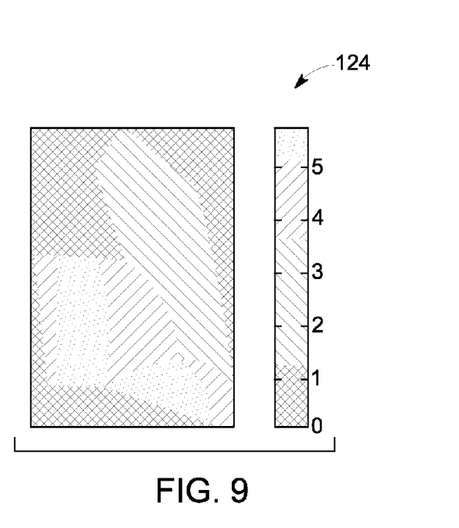
FIG. 9 depicts a child active appearance sub-model of a left lung, in accordance with aspects of the present disclosure.

With respect to the second (and finer) levels of the H-AAM pyramid, a respective global model (such as the chest cavity model discussed above) is split into two or more child sub-models, such as a right lung sub-model and a left lung sub-model in the present example. In one embodiment, the sub-models are derived from the same training images used to construct the respective global model but using a subset of the feature points used to build the global model. By way of example, FIGS. 6-9 show the constructed sub-models for the right lung 88 and left lung 90, with FIG. 6 depicting the child active shape (AS) sub-model 118 for the right lung, FIG. 7 depicting the child AS sub-model 120 for the left lung, FIG. 8 depicting the child active appearance (AA) sub-model 122 for the right lung, and FIG. 9 depicting the child AA sub-model 124 for the left lung. Note that, in this example, the two sub-models partially overlap, with each sub-model including a common section of the spine. In other examples, respective sub-models may not overlap or may overlap to a greater extent. In the present example, apart from aiding the detection and fitting of the lung boundary, the overlap region allows the fit of one lung to influence the fit of the other lung. This may be beneficial in this instance, since in practice the detection of the right lung may be more robust and reliable than that of the left lung due to the off-center tilt of the heart.

Figure 10:
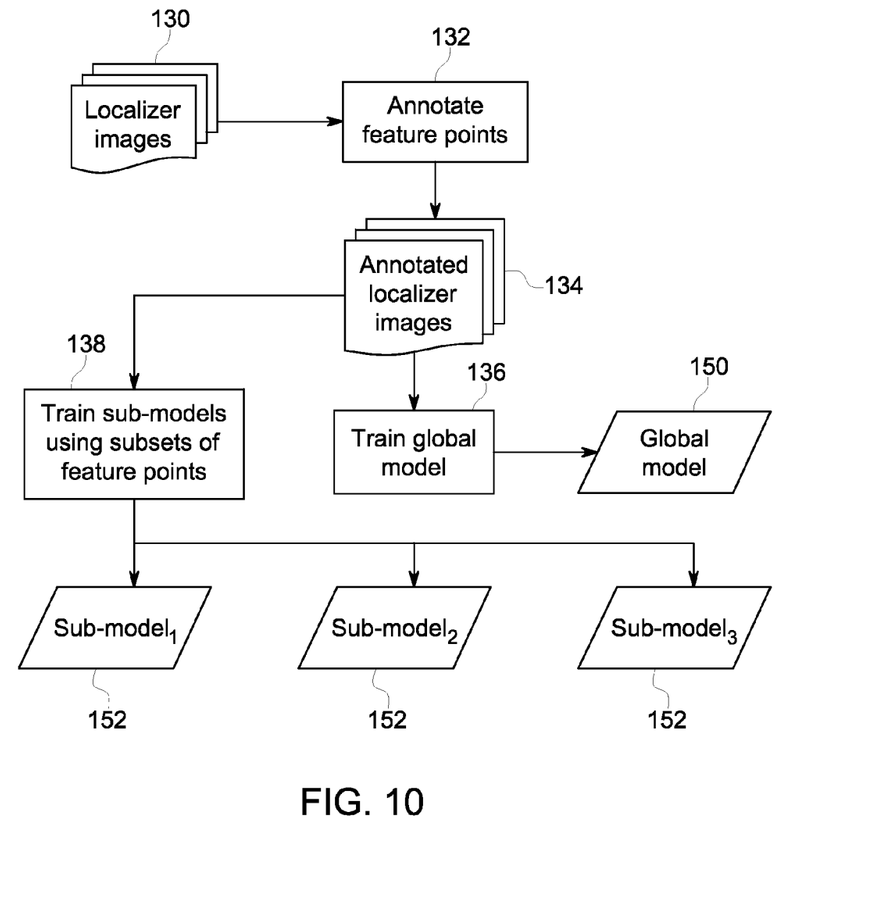
FIG. 10 depicts control flow logic for constructing hierarchical models, in accordance with aspects of the present disclosure.

With the foregoing in mind, a generalized, high-level flowchart describing steps that may be used to construct a global model 150, and respective child sub-models 152 is depicted in FIG. 10. In this example, one or more localizer or scout images 130 (e.g., topograms) are initially acquired and annotated (block 132) to include feature points of the anatomy of interest. The annotated localizer images 134 are then used, as discussed therein, to train (block 136) the global model 150 and to train (block 138) the child sub-models 152.

Once the respective global model 150 and child sub-models 152 constituting a hierarchical-active appearance model (H-AAM) pyramid are constructed, the model pyramid may be initialized. For example, in the present context of a chest cavity model pyramid, the global model 150 is seeded in the vicinity of the lungs and the heart with respect to a current set of image data. By way of illustration with respect to the present chest cavity example a naïve thresholding scheme followed by morphological operations may be employed to detect the lungs based on the characteristic drop in HU values of an anterior-posterior (AP) CT chest topogram around the lungs.

Figure 11:
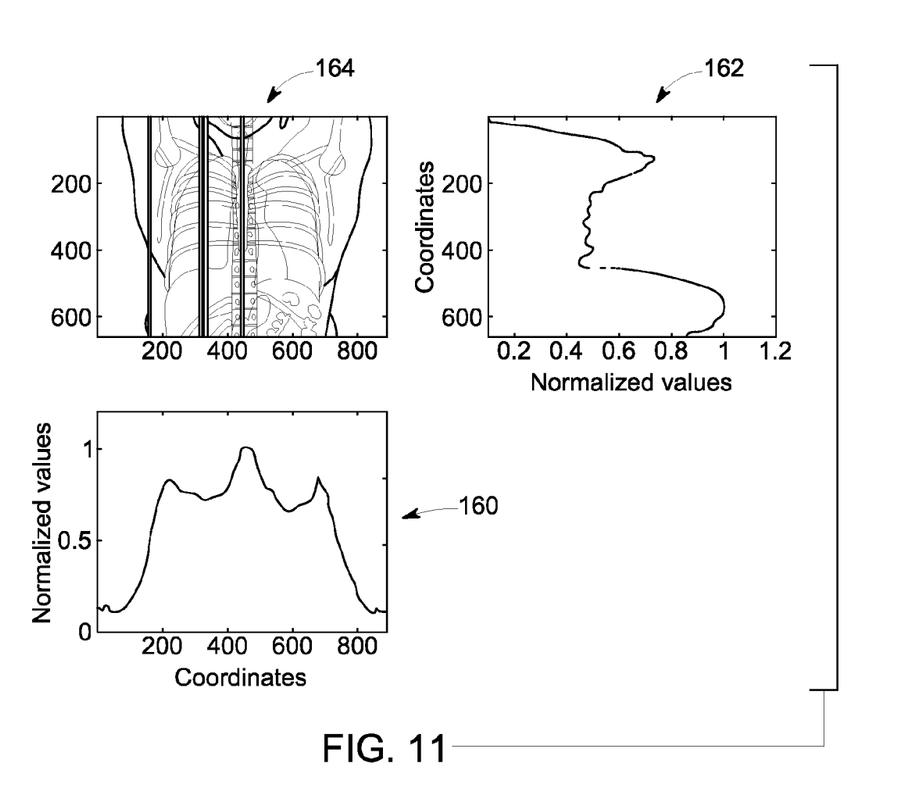
FIG. 11 depicts a sample localizer images and profiles generated based upon the sample localizer image, in accordance with aspects of the present disclosure.

Because measured HU values fluctuate with changes in scan conditions, patient and organ size, and other factors it may be difficult to determine a universal lung-tissue HU threshold applicable across a large population. Therefore, in one implementation two orthogonal profile signatures may be used to detect the extents of the lungs (from the top of the lungs to the domes of the diaphragm) for model initialization. Turning to FIG. 11, in one such implementation, a first profile 160 is used to estimate the center of each lung in the left-right (LR) direction, while a second profile 162 estimates lung extents along the superior-inferior (SI) axis (e.g., is a narrow band projection onto the SI axis). Both profiles are based on HU measurements derived from a patient localizer image 164 of the anatomical region modeled by the global model 150.

The first profile 160, in this example, is generated by accumulating HU values along the SI direction to yield a projection onto the left-to-right (LR) axis. The peak of the LR projection depicted in first profile 160 localizes the spinal column $u_{sc}$ and the peaks of the derivative of the LR projection correspond to the left and right outer walls of the body $u_{lb}$ and $u_{rb}$. The center of the left lung $c_{ll}$ and right lung $c_{rl}$ is estimated by a convex combination of ($u_{lb}$ and $u_{sc}$) and ($u_{sc}$ and $u_{rb}$) respectively.

The second orthogonal profile signature 162, for the right lung in the depicted example, is generated by accumulating HU values along the left-to-right direction in a thin band centered at $c_{rl}$, as shown in FIG. 11 (top-right). After preprocessing and smoothing to counter the effects of air-gaps, metal objects or implants and noise, the resulting SI profile in the chest cavity example follows a typical pattern: values of profile segments lying in the lung regions are defined by a local minima, since the lungs are surrounded by denser tissue (diaphragm at the bottom) and bone regions (clavicles at the top). Thus the extents of the lung can be estimated by subdividing the SI profile into contiguous clusters with similar profile-values separated by changes in the derivative of the profile-values. In the chest cavity example, the cluster with the smallest mean value corresponds to the lung region and may be used as a seed to determine the extents of the lung. The lower and upper extents of the lung are given by a fixed offset from the maxima of the smoothed SI profile in the segment below or above the seed, respectively. The magnitude of the offset is related to the smoothing introduced by the preprocessing. A similar process is repeated to find the extents of the left lung. The global model 150 is then centered and initialized to span the bounding box enclosing both lungs.

Figure 12:
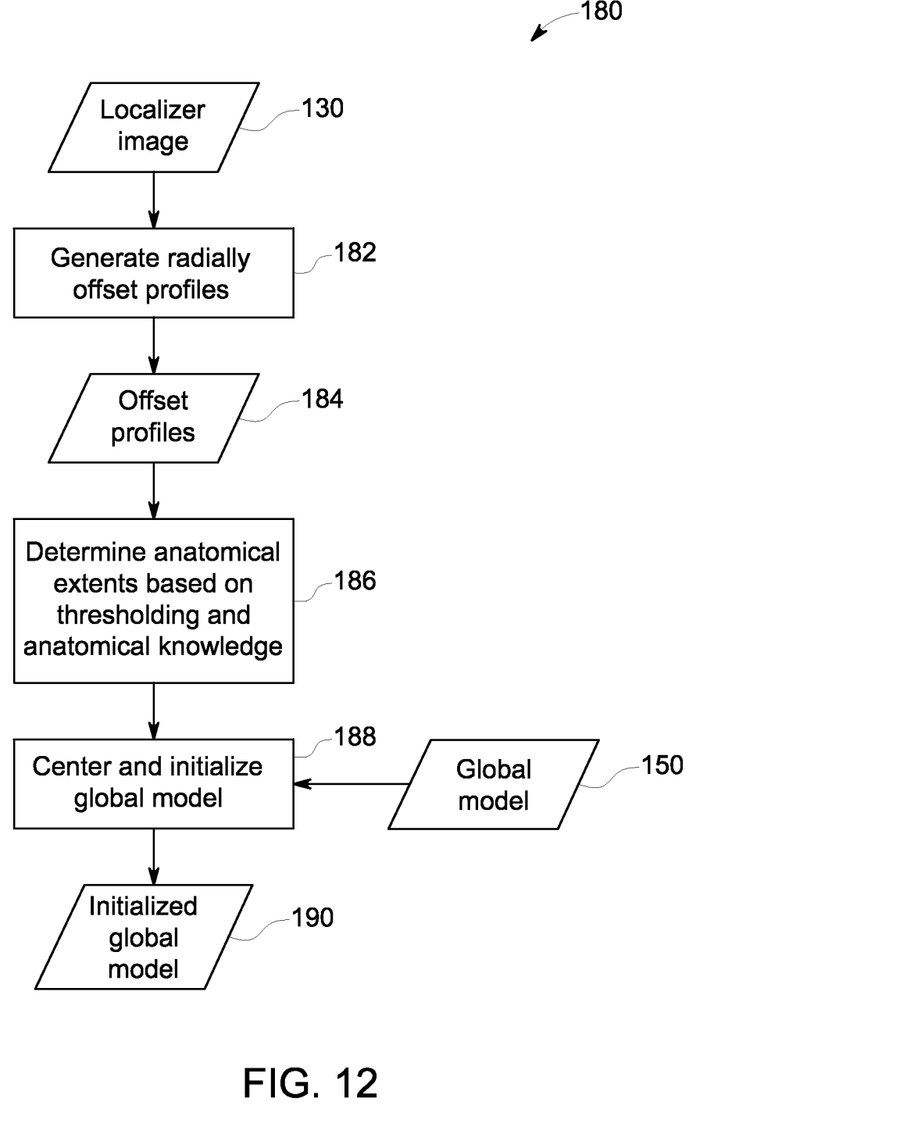
FIG. 12 depicts control flow logic for initializing a global model, in accordance with aspects of the present disclosure.

With the foregoing example in mind, a generalized implementation of such an initialization scheme is depicted in the flowchart 180 of FIG. 12. In this example, a localizer image 130 is provided, such as a localizer image 130 of a patient presently undergoing an imaging session. The localizer image 130 may be used to generate (block 182) one or more profiles 184 conveying intensity as measured along a respective axis, such as by projection along the axis or by accumulating HU values along the axis. In certain implementations, the profiles 184 are generated at offset angles relative to one another, such as orthogonal to one another. The profiles 184 are analyzed (block 186), such as based upon predetermined thresholds and known anatomical relationships, to allow determination of the extent of the anatomical structures within the localizer image 130. Based on the determination of the anatomical extents, the global model 150 may be initialized (block 188) (e.g., centered) with respect to the patient to produce an initialized global model 190 for the current imaging session.

Following initialization, in the first level of the hierarchy the parent global model 150 is evolved to fit the target image. In one embodiment, optimal shape and appearance parameters are found by minimizing the difference between the current estimate of the structure's appearance and the target image, such as by using the Simultaneously Inverse Compositional (SIC) approach. In such an implementation, SIC switches the role of the appearance model and the input image allowing for pre-computation of the Hessian matrix.

The coarse fit of the parent global model 150 is refined at the second level of the hierarchical model pyramid. At this finer level, the child sub-models (two child sub-models in the present example) for the right and left lung (shown in FIGS. 6-9) are fit to the target image. In certain implementations, such as the present chest cavity example, the two child sub-models may be fit to the target sequence in a particular sequence. For example, in the chest cavity example, it is easier to detect the right lung in anterior-posterior CT chest topograms, as this region has stronger contrast than the left lung, which is occluded by the heart. Hence, in the chest cavity example it may be desirable to first initialize and refine the fit of the right-lung sub-model based on the coarse fit of the global model, using the same fast SIC optimization strategy described above.

Further, in certain implementations hard constraints may be added to certain feature points, such as on the top of the right-lung, which adhere to the fit dictated by the global model. That is, constraints from one mode, such as the global model, may be incorporated in downstream processing of the sub-models. For example, in the chest cavity context where constraints may be employed with respect to feature points at the top of the right-lung, these feature-points are robustly detected by the global model, are farther away from the heart and can act as reliable 'anchor' points to ensure that the child sub-model does not drift too far away from the parent global model fit. In this example, once the right-lung sub-model has been refined, both the fitted global model and the refined right-lung sub-model may be leveraged to refine the detection of the left-lung. As discussed above, points on the top of the left-lung may be adhered (i.e., constrained) to positions given by the global model fit. In addition, feature points in the spine region common to both child sub-models may be constrained to positions based on the refined fit of the right-lung sub-model. In this manner, contextual constraints on the weaker left-lung sub-model may be enforced by restricting movements of stable feature points robustly estimated by preceding levels of the hierarchical pyramid. At the same time, the left-lung sub-model is given sufficient flexibility and mobility to allow refinements of feature points on the boundary of the heart.

In this manner, the multi-level, hierarchical-active appearance model (H-AAM) approach discussed herein allows easily detectable gross structures to anchor the alignment of smaller, less discernible structures. Conversely, errors in the gross global parent model fit are mitigated by the more detailed, partially mobile child sub-models; giving the H-AAM approach enough flexibility to handle shape and appearance configurations not represented in the training database.

Further, based on the refinements and improved localization provided by the hierarchical model approach, bounding boxes encompassing the region of interest to be imaged may be more accurately defined. Improvements in the localization of the region of interest may allow subsequent image acquisition to be performed more rapidly or with reduced radiation dose, due to the more limited region that is imaged.

Technical effects of the invention include the use of a set hierarchical models, such as a parent model and two or more child sub-models, to process an anatomical image, such as a localizer or scout image, to identify regions of interest. The identification of the regions of interest in the localizer image may be used to plan subsequent, higher resolution image acquisitions.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A computer-implemented method for initializing a global model of a set of hierarchical models, comprising:
    accessing a localizer image acquired as part of a patient examination being currently performed using an imaging system, wherein the localizer image comprise a two-dimensional projection of three-dimensional data acquired by the imaging system;
    generating one or more two-dimensional profiles of radiation attenuation based on the localizer image;
    determining extents of one or more anatomical structures within the patient based on the one or more two-dimensional profiles by applying an intensity-based threshold to the one or more two-dimensional profiles; and
    initializing the global model of the set of hierarchical models based on the determined extents.

2. The computer-implemented method of claim 1, wherein each two dimensional profile represents radiation attenuation in a different direction with respect to the localizer image.

3. The computer-implemented method of claim 1, wherein the one or more two-dimensional profiles comprise two two-dimensional profiles generated orthogonal to one another.

4. The computer-implemented method of claim 1, further comprising:
    fitting the global model and one or more sub-models of the set of hierarchical models;
    identifying a region of interest within the patient based upon the fitted set of hierarchical models; and
    acquiring images of the region of interest as part of the current patient examination.

5. The computer-implemented method of claim 4, wherein fitting the global model comprises determining shape and appearance parameters for the global model by minimizing the difference between a current estimate of an appearance of an anatomical structure interest and the localizer image.

6. The computer-implemented method of claim 4, wherein fitting the one or more sub-models comprises constraining the fit of the one or more sub-models based upon the results of fitting the global model.

7. An image acquisition system, comprising:
    one or more scanner components that non-invasively acquire images of a patient;
    a controller configured to control operation of the one or more scanning components;
    a memory storing one or more routines; and
    a processing component that communicate with the controller and to execute the one or more routines stored in the memory, wherein the one or more routines, when executed by the processing component, cause acts to be performed comprising:
        accessing a localizer image acquired as part of a patient examination being currently performed using the image acquisition system, wherein the localizer image comprise a two-dimensional projection of three-dimensional data acquired by the imaging system;
        generating one or more two-dimensional profiles of radiation attenuation based on the localizer image;
        determining extents of one or more anatomical structures within the patient based on the one or more two-dimensional profiles by applying an intensity-based threshold to the one or more two-dimensional profiles; and
        initializing the global model of the set of hierarchical models based on the determined extents.

8. The image acquisition system of claim 7, wherein the one or more scanner components comprise:
    a source of radiation configured to emit radiation toward an imaging volume;
    a detector configured to detect the emitted radiation; and
    a positioning system configured to move the source of radiation and detector with respect to the imaging volume.

9. The image acquisition system of claim 7, wherein each two dimensional profile represents radiation attenuation normalized along different directions with respect to the localizer image.

10. The image acquisition system of claim 7, wherein determining extents of one or more anatomical structures comprises analyzing the attenuation of radiation represented by the respective two-dimensional profile based on known anatomical spatial relationships.

11. The image acquisition system of claim 7, wherein the one or more routines, when executed by the processing component, cause further acts to be performed comprising:
   fitting the global model and one or more sub-models of the set of hierarchical models;
   identifying a region of interest within the patient based upon the fitted set of hierarchical models; and
   acquiring images of the region of interest as part of the current patient examination.

12. The image acquisition system of claim 11, wherein fitting the one or more sub-models comprises constraining the fit of the one or more sub-models based upon the results of fitting the global model.

\* \* \* \* \*